US012681507B2

(12) United States Patent
Martinez

(10) Patent No.: US 12,681,507 B2
(45) Date of Patent: Jul. 14, 2026

(54) SOFTWARE AND ASSEMBLY FOR POINTING AND TILTING SOLAR PANELS

(71) Applicant: National Signal LLC, Fullerton, CA (US)

(72) Inventor: Guadalupe Martinez, La Habra, CA (US)

(73) Assignee: National Signal LLC, Fullerton, CA (US)

( * ) Notice: Subject to any disclaimer, the term of this patent is extended or adjusted under 35 U.S.C. 154(b) by 356 days.

(21) Appl. No.: 18/481,812

(22) Filed: Oct. 5, 2023

(65) Prior Publication Data

US 2025/0117032 A1     Apr. 10, 2025

(51) Int. Cl.
*G05D 3/12* (2006.01)
*H02S 20/30* (2014.01)

(52) U.S. Cl.
CPC ............. *G05D 3/125* (2013.01); *H02S 20/30* (2014.12)

(58) Field of Classification Search
CPC ................................ G05D 3/125; H02S 20/30
See application file for complete search history.

(56) References Cited

U.S. PATENT DOCUMENTS

| | | | | |
|---|---|---|---|---|
| 8,522,773 B2 * | 9/2013 | Meyer | ..................... | F24S 50/00 |
| | | | | 136/246 |
| 8,895,836 B2 * | 11/2014 | Amin | ..................... | H02S 20/00 |
| | | | | 136/246 |

| | | | | |
|---|---|---|---|---|
| 9,325,364 B2 | 4/2016 | Teichmann | | |
| 9,634,519 B2 * | 4/2017 | King | ........................ | G06F 1/263 |
| 9,810,387 B2 * | 11/2017 | Knodel | .................... | F21L 14/04 |
| 10,902,159 B2 * | 1/2021 | Wachman | ............... | G06F 30/00 |
| 12,152,758 B2 * | 11/2024 | Martinez | ................... | F21L 4/00 |
| 2010/0232148 A1 * | 9/2010 | Sharpley | ................. | F21V 21/22 |
| | | | | 362/183 |
| 2011/0017259 A1 * | 1/2011 | Mann | ...................... | H02S 20/00 |
| | | | | 248/122.1 |
| 2012/0201015 A1 * | 8/2012 | Robertson | ............... | F21L 14/04 |
| | | | | 362/183 |
| 2013/0211844 A1 * | 8/2013 | Sadwick | ................ | G08C 17/00 |
| | | | | 704/275 |
| 2014/0338723 A1 | 11/2014 | Flynn | | |

(Continued)

FOREIGN PATENT DOCUMENTS

| | | |
|---|---|---|
| CN | 110829964 A | 2/2020 |
| CN | 214626894 U | 11/2021 |
| WO | 2017105171 A1 | 6/2017 |

*Primary Examiner* — Gertrude Arthur Jeanglaude
(74) *Attorney, Agent, or Firm* — DANE IP Law PC

(57)     ABSTRACT

A software and assembly for pointing and tilting solar panels at optimum positions and a method of using thereof is disclosed. A mobile device having the software application may be attached to the side of the solar panels to measure the compass direction and tilting angular direction of the solar panels. The mobile device may display a compass meter and tilting meter showing the current and optimum compass directions and tilting directions of the solar panels. As the solar panels change orientation, the current compass and tilting directions may change on the mobile device. The optimum compass and tilting directions may be determined based on the location of the solar panels and time of year and may correspond to the orientation where the solar panels would receive maximum or close to maximum solar energy from the sun.

20 Claims, 14 Drawing Sheets

(56)        References Cited

U.S. PATENT DOCUMENTS

| | | | |
|---|---|---|---|
| 2015/0268639 A1* | 9/2015 | Abe ........................ | G04R 20/04 368/47 |
| 2016/0190978 A1* | 6/2016 | Domaleski ............. | H02S 40/36 136/251 |
| 2020/0340804 A1* | 10/2020 | Santamarina ...... | G01N 15/0227 |
| 2020/0366125 A1* | 11/2020 | Chen ........................ | H02J 7/35 |

* cited by examiner

SOFTWARE AND ASSEMBLY FOR POINTING AND TILTING SOLAR PANELS

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various aspects and embodiments described herein relate to software and assembly for pointing and tilting solar panels and a method of using thereof.

Solar panels are used to harvest solar energy and convert such energy into electricity. Solar panels may be utilized to provide electricity to various electrical and electromechanical devices, some of such devices may have rechargeable batteries to store the electricity.

Accordingly, there is a need in the art for an improved device, system, and method for utilizing solar panels to power electrical and electromechanical devices or store electricity in rechargeable batteries.

BRIEF SUMMARY

The various embodiments and aspects disclosed herein address the needs discussed above, discussed below and those that are known in the art.

A software and assembly for pointing and tilting solar panels at optimum positions and a method of using thereof is disclosed. A mobile device having the software application may be attached to the side of the solar panels to measure the compass direction and tilting angular direction of the solar panels. The solar panels may be part of portable solar light towers that are powered by the solar energy harvested by the solar panels. The mobile device being attached to the side of the solar panels may allow for a user to more conveniently read the measurements displayed on the mobile device screen. The mobile device may display a compass meter and tilting meter showing the current and optimum compass directions and tilting directions of the solar panels. As the solar panels change orientation, the current compass and tilting directions may change on the mobile device. The optimum compass and tilting directions may be determined based on the location of the solar panels and time of year and may correspond to the orientation where the solar panels would receive maximum or close to maximum solar energy from the sun. With the usage of the software application, a user may travel to different GPS locations and orientate the solar panels at such locations to the optimum orientation at a time different than when the sun is at its optimum position. For example, a supervisor could go to a location before the sun rises and point the solar panels to the optimum compass direction and also tilt the solar panels to the optimum tilt angle for the day.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1A:
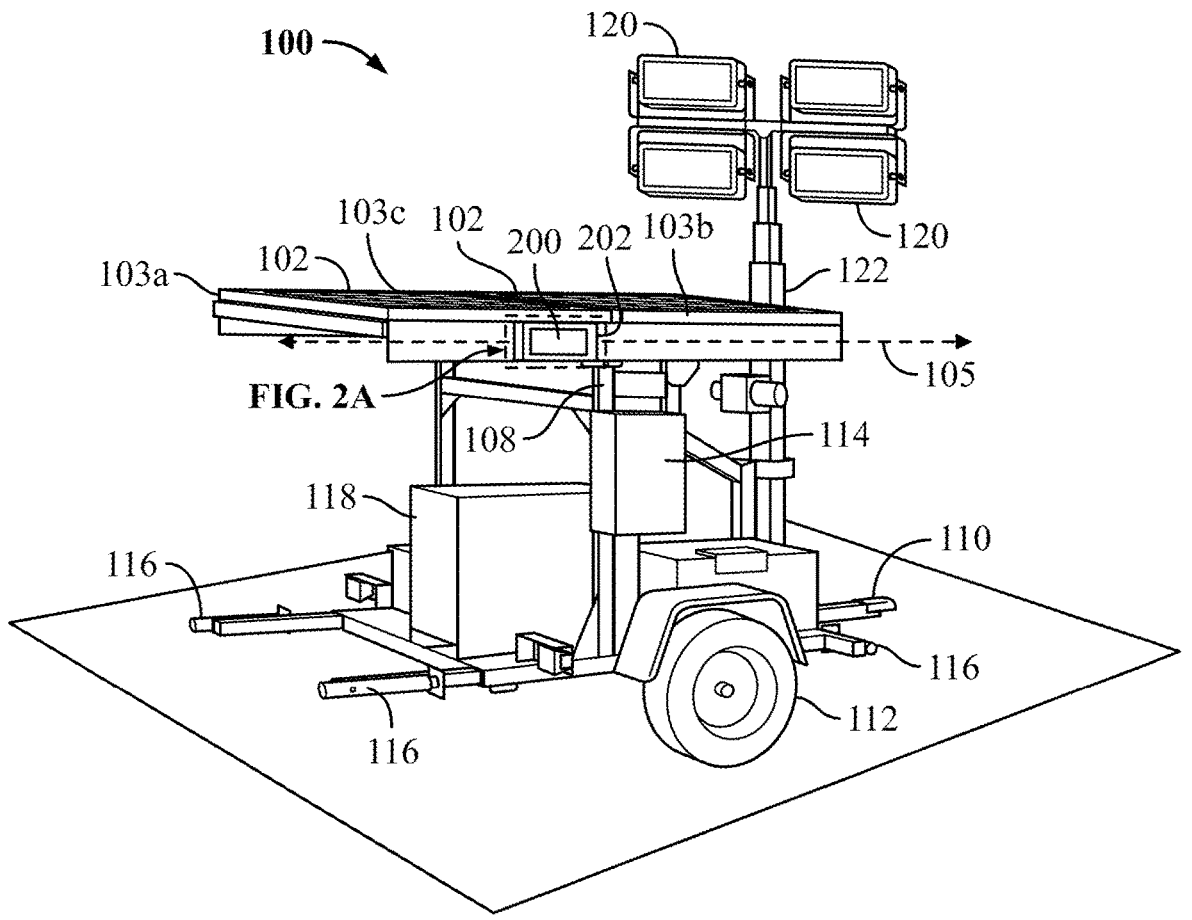
FIG. 1A shows a solar light tower with solar panels at a subpar orientation for harvesting solar irradiation.
Figure 1B:
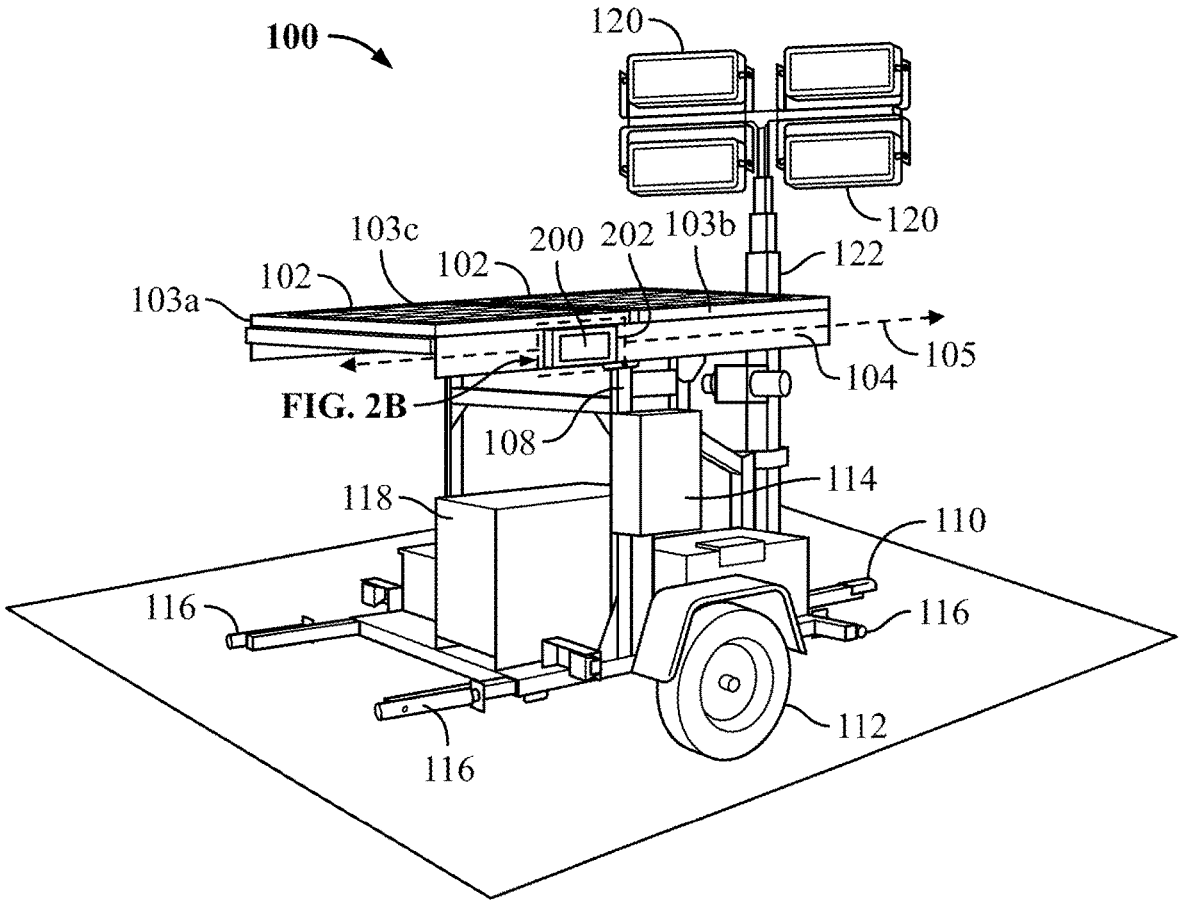
FIG. 1B shows the solar light tower with the solar panels pointed at an optimum compass direction for harvesting solar irradiation.
Figure 1C:
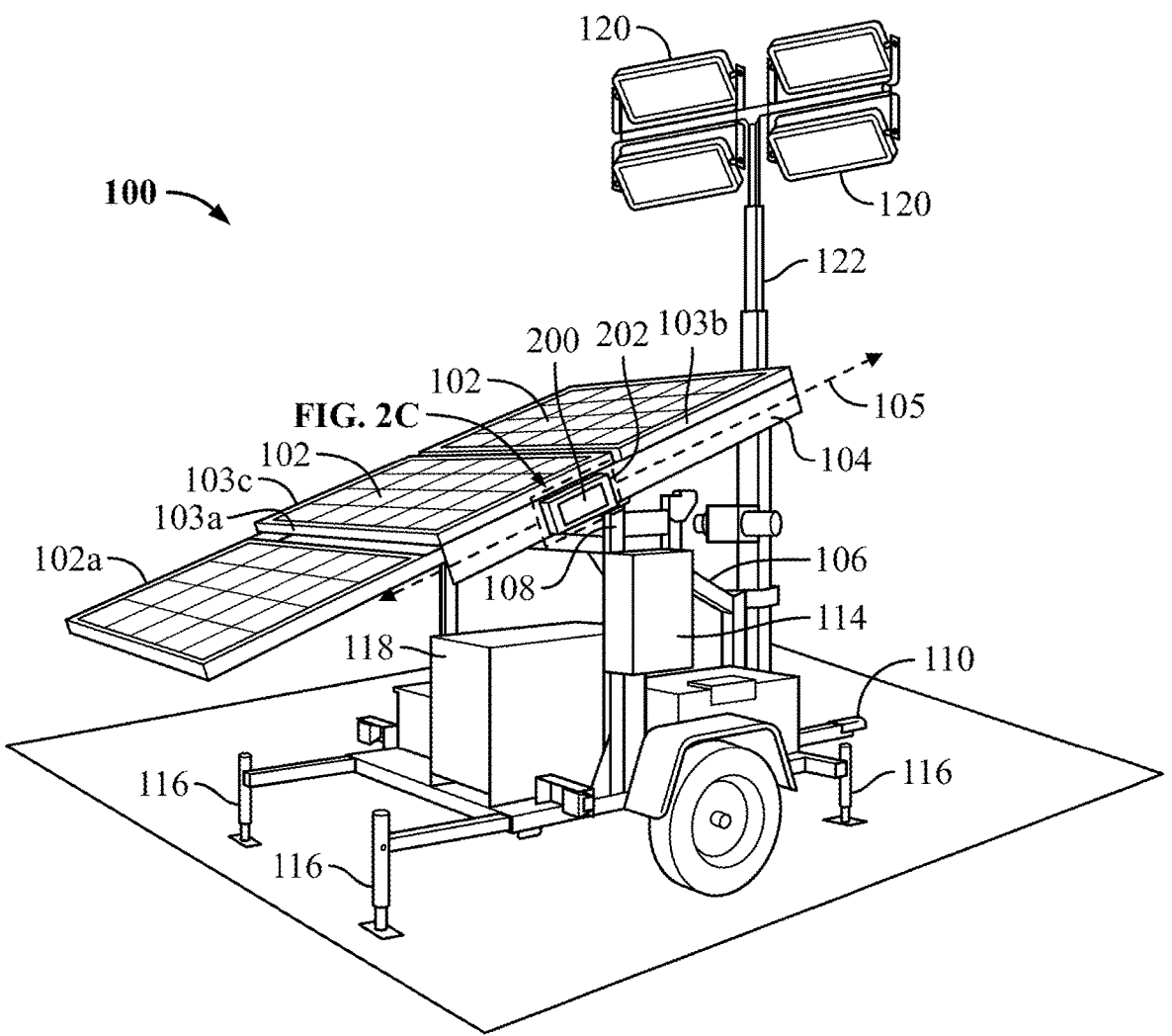
FIG. 1C shows the solar panels tilted at an optimum angular direction for harvesting solar irradiation.
Figure 2A:
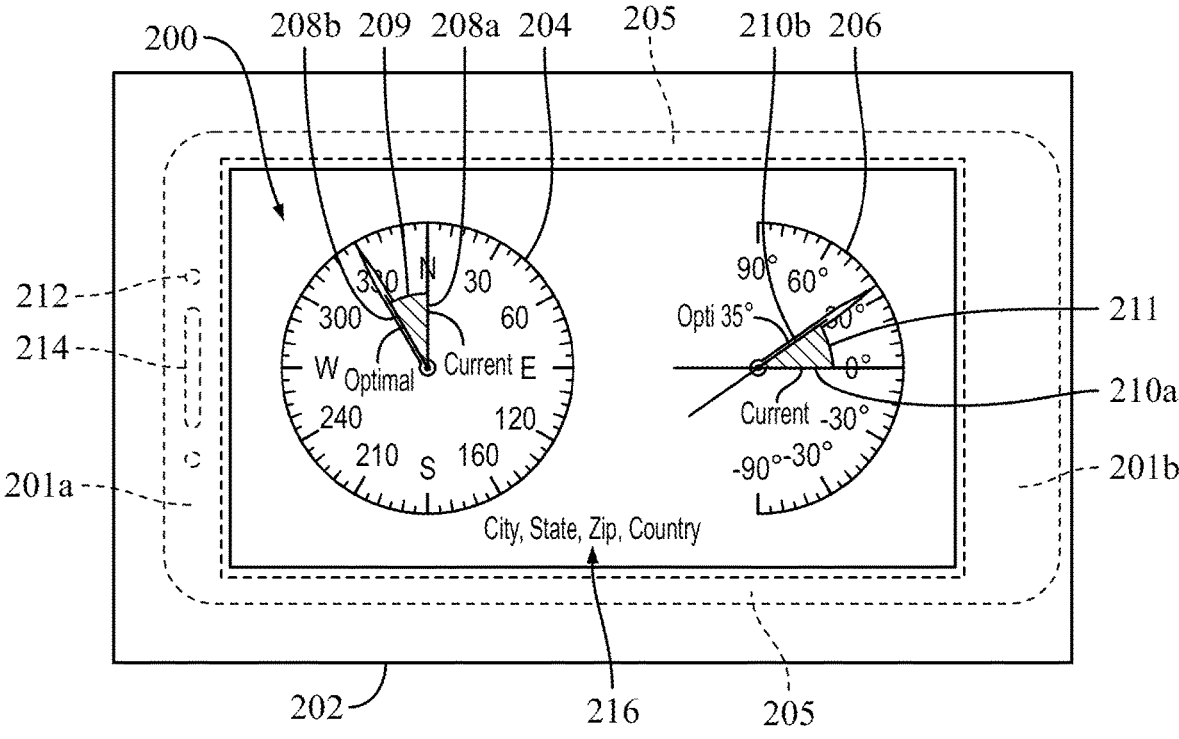
FIG. 2A shows a smartphone in a mounting bracket of the solar panels displaying compass and tilting meters corresponding to the orientation of the solar panels in FIG. 1A.
Figure 2B:
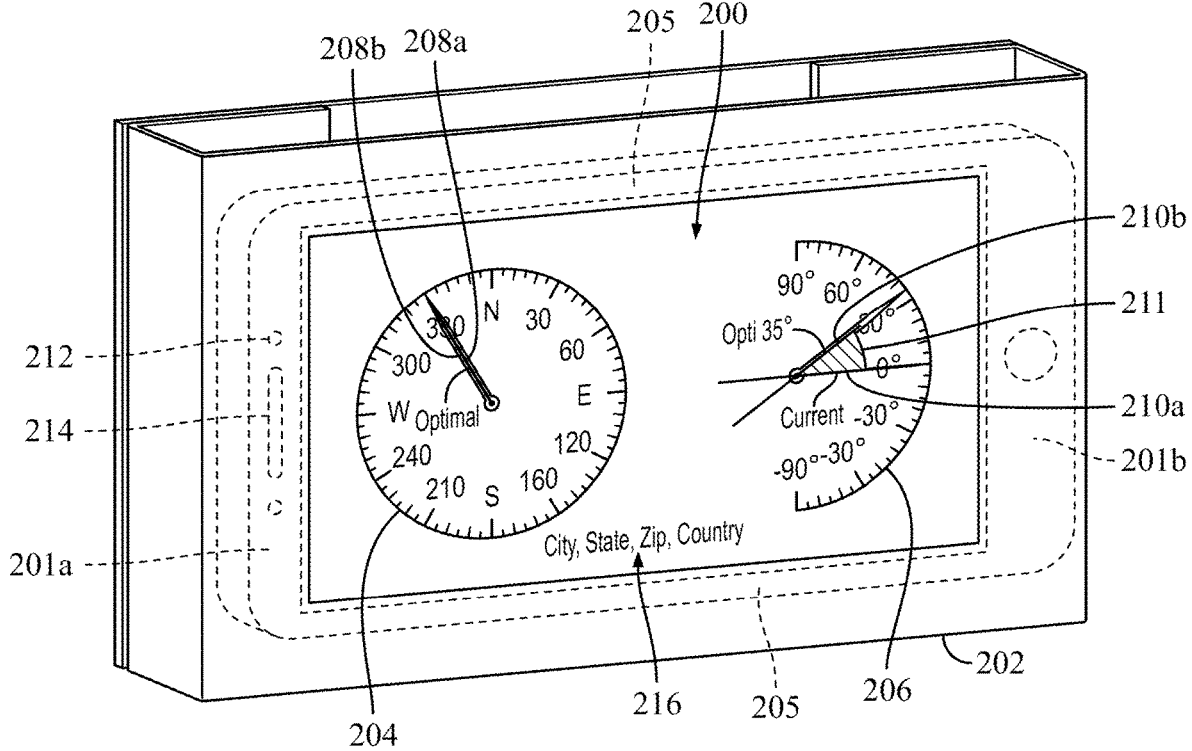
FIG. 2B shows the smartphone in the mounting bracket of the solar panels displaying compass and tilting meters corresponding to the orientation of the solar panels in FIG. 1B.
Figure 2C:
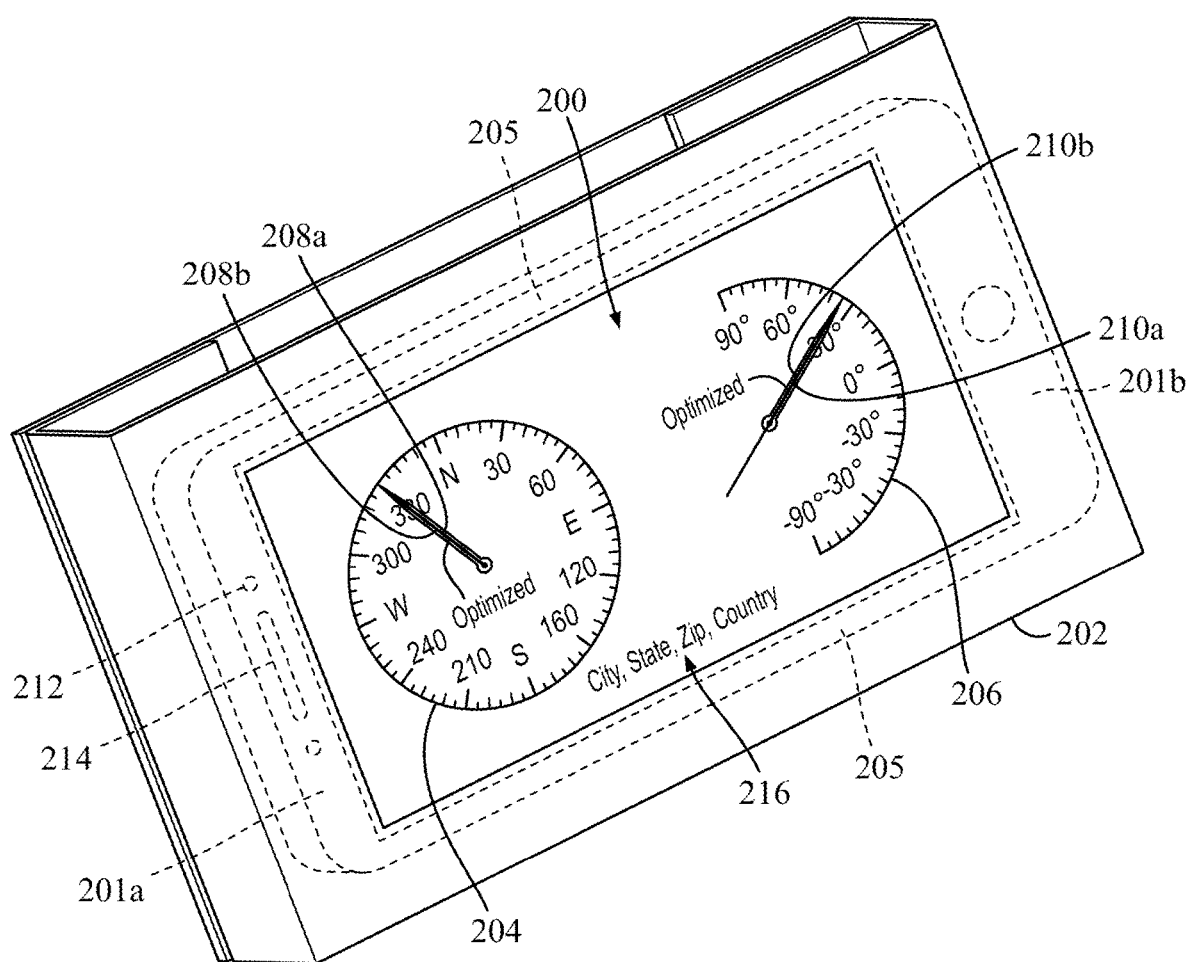
FIG. 2C shows the smartphone in the mounting bracket of the solar panels displaying compass and tilting meters corresponding to the orientation of the solar panels in FIG. 1C.
Figure 3:
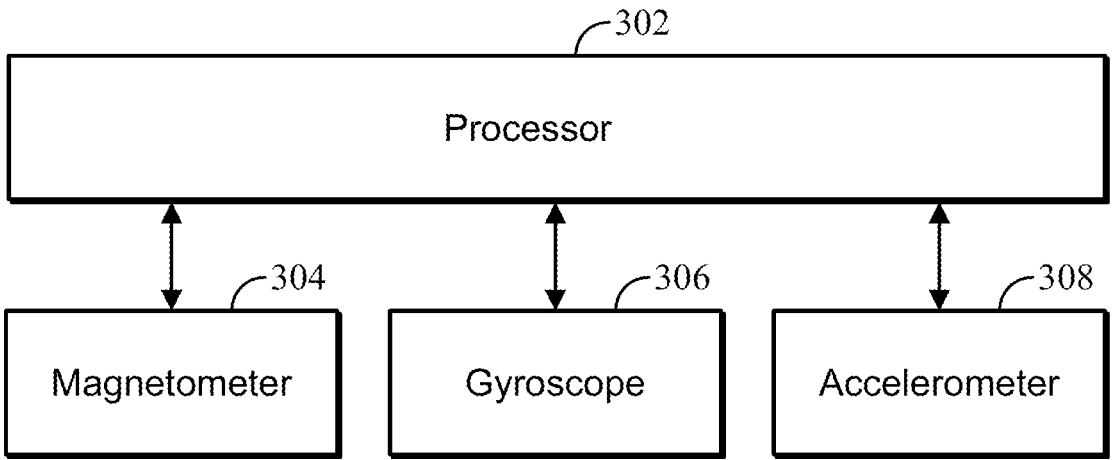
FIG. 3 shows a block diagram of the sensors of the smartphone responsible of detecting the change in point and tilt of the solar panels.
Figure 4:
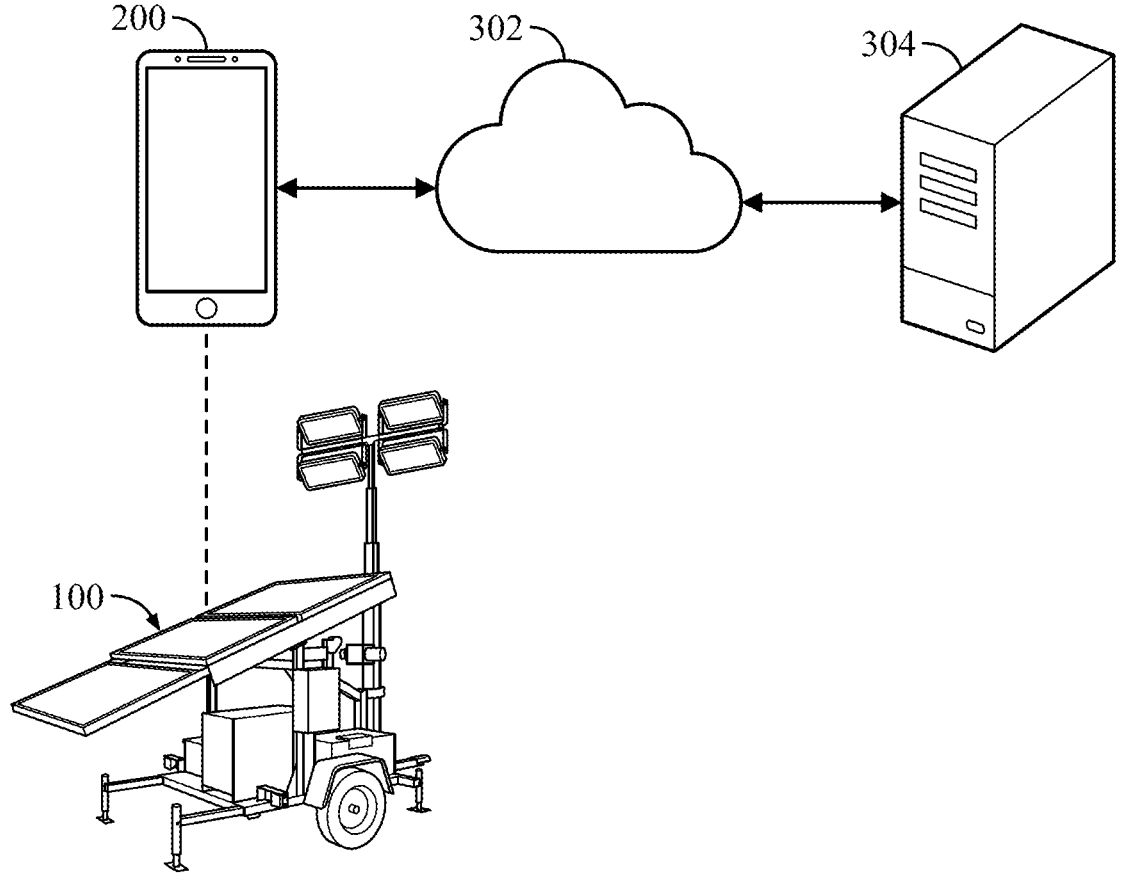
FIG. 4 shows a diagram of the smartphone in connection with a database/server to receive the optimum point and tilt direction for the solar panels.

Referring now to the figures, software and assembly for pointing and tilting solar panels at optimum positions and a method of using thereof is disclosed. As shown in FIGS. 1A-C, the solar panels 102 may be part of a portable solar light tower 100. A mobile device (e.g., a smartphone 200) having the software application may be attached to the side of the solar panels 102 to measure the compass direction and tilting angular direction of the solar panels. As shown in FIGS. 2A-C, the smartphone 200 may display a compass meter 204 and a tilting meter 206 to measure the current compass direction 208a and current angular tilt direction 210a of the solar panels 102. The smartphone may also display optimum compass direction 208b and optimum angular tilt direction 210b corresponding to the location of the solar panels 102 and time of year. The compass and tilt measurements on FIGS. 2A-C may correspond to the orientation of the solar panels 102 in FIGS. 1A-C, respectively. As shown in the block diagram of FIG. 3, the smartphone 200 may determine the compass direction and tilting direction of the solar panels 102 using one or more sensors within the smartphone 200. As shown in FIG. 4, the smartphone 200 may determine the optimum compass and tilting direction by retrieving information from a database/server 304 based on the location of the solar panels and the time of year.

Referring specifically now to FIGS. 1A-C, the transition of a portable solar light tower 100 and the attached solar panels 102 to an optimum compass direction and angular orientation relative to the sun is shown. As shown in FIGS. 2A-C that correspond to FIGS. 1A-C, respectively, the direction and angular position of the solar panels 102 may be measured and tracked using a software application on a mobile device, such as a smartphone 200, that is attached to the side of the solar panels 102. By way of example and not limitation, other mobile devices that may be used include a computer tablet. The software application may also provide and display the optimum direction and angle that the solar panels 102 should be facing, as shown in FIGS. 2A-C, based on the location of the solar panels 102 and time of year. Consequently, a user may use the software application to determine and orientate the solar panels 102 in the optimum direction and angle relative to the solar irradiation of the sun. By way of example and not limitation, the optimum direction and angle may be determined based on a time duration during the day, such as noon time or a certain number of hours (e.g., 1-4 hours) around such time. With the smartphone 200 having the software application attached to the side of the solar panels 102 instead of on top of the panels, a user may conveniently read what is displayed on the compass meter 204 and tilt meter 206 on the smartphone 200.

By way of example and not limitation, and as shown in FIG. 1A, the solar panels 102 may be attached to a portable solar light tower 100. The lighting system of the solar light tower 100 may be partially or fully powered by the solar energy stored in one or more rechargeable batteries 118. By way of example and not limitation, the solar light tower 100 may have a base frame having a front side, a back side that has a hitch 110 for transportation and is opposite to the front side, a left side, and a right side. The front and back side of the frame may have a plurality of stabilizers 116 to fix the light tower 100 in place once orientated in the desired position. Near the back side of the frame, and by way of example and not limitation, a light pole 122 extending upwards with a plurality of LED lighting lamps 120 may exist, where the light pole 122 may change length via a telescoping mechanism. By way of example and not limitation, the back side of the frame having the hitch 110 for transportation may be used in pointing the solar light tower 100 and the solar panels 102 in the optimum compass direction. By way of example and not limitation, the frame may store rechargeable batteries 118 and power generator motors. The base frame of the portable solar light tower 100 may have at least two wheels 112 attached, where one wheel is attached to the left side and the other wheel is attached to the right side of the frame. By way of example and not limitation, a third swivel wheel 113 may be attached at the back side of the base frame to help in pointing the light tower 100 and the solar panels 102 in different directions.

By way of example and not limitation, the base frame of the light tower 100 may have vertical racks 108 holding the solar panels 102. By way of example and not limitation, the solar panels 102 may be held four to six feet off the ground when laid horizontal on the racks 108, as shown in FIG. 1A. By way of example and not limitation, the solar panels 102 may be coupled to a tilting mechanism 106 (see FIG. 1C) designed to change the angular orientation of the solar panels 102. By way of example and not limitation, the tilting mechanism 106 may be motorized or actuated manually. By way of example and not limitation, the left or right side of the rack may have a control panel 114 used to operate the different components and functions of the solar light tower 100 described elsewhere herein, including the solar panels 102.

There may exist one or more solar panels 102 on the solar light tower 100. By way of example and not limitation, there may exist two or more solar panels 102 aligned with each other with bar frames 104 on the left 103*c* and right sides 103*b* of the solar panels 102 (see FIG. 1B). The length of the bar frames 104 may be parallel and coincide to the left 103*c* and right sides 103*b* of the solar panels 102 that are positioned in the same orientation as the left and right sides of the base frame of the solar light tower 100. By way of example and not limitation, one or more of the bar frames 104 may have a mounting bracket 202 for the smartphone 200 to be placed within so that the software application may calculate and determine the compass direction and tilting angular orientation of the solar panels 102. With the smartphone 200 mounted to the sides of the solar panels 102, a user may conveniently get a real-time reading of the change in orientation of the solar panels 102. The mounting bracket 202 also ensures that the smartphone 200 is secured in place when moving the solar panels in the optimum orientations. By way of example and not limitation, there may exist a sliding solar panel 102*a* that slides in and out under the solar panels 102 and within the bar frames 104.

FIGS. 1A-C show the sequential steps of orientating the solar panels 102 of the light tower 100 in the optimum position relative to the sun. Such an optimum position may be achieved at a time different from when the sun is at its optimum position. By way of example and not limitation, the setup time of the solar panels 102 in the optimum point and tilt position may be before when the sun rises or after when the sun sets.

The orientation of the solar panels 102 shown in FIG. 1A may not be at an optimum orientation relative to the sun. Accordingly, the solar panels 102 may be pointed in the optimum direction, as shown in FIG. 1B, and tilted in the optimum angular position, as shown in FIG. 1C. By way of example and not limitation, the solar light tower 100 may also be pointed at the optimum direction with the solar panels 102 since the panels are part of the light tower. A mobile device, such as a smartphone 200, may be attached to the side of one of the solar panels 102, or to the bar frame 104 at the side of the solar panels 102, to allow a user track the pointing direction and tilting angle of maneuvering the solar panels 102 in the optimum position. Such tracking may be done using an application software on the smartphone 200. The attachment of the smartphone 200 to the side of the solar panel 102 may be more preferred than attaching the smartphone on the top of the solar panels since a user may read the point and tilt measurement on the smartphone display more conveniently. Additionally, the smartphone 200 would not be blocking a portion of the solar panels 102 when determining point and tilt directions. The usage of a mounting bracket 202 may ensure that the smartphone 200 stays secured to the side of the solar panels 102. Consequently, the calibration of the smartphone to measure the compass direction and tilting direction of the solar panels from the side of the panels may allow for a more convenient usage of the software application.

With reference to FIGS. 2A-C, the smartphone 200 inside the mounting bracket 202 attached to the side of the solar panels 102 is shown displaying measuring meters 204, 206 for determining the pointing direction and tilting angular direction of the solar panels 102. The measurement display shown in FIG. 2A may correspond to the orientation of the solar panels 102 of FIG. 1A, the display of FIG. 2B may correspond to FIG. 1B, and FIG. 2C may correspond to FIG. 1C. As shown in FIG. 3, the sensors within the smartphone, such as the magnetometer 304, gyroscope 306, and accelerometer 308 (See FIG. 3), may be used to track the orientation of solar panels 102. By way of example and not limitation, the measurements done by such sensors may be processed by processor 302 and displayed on the smartphone 200. By way of example and not limitation, the gyroscope 306 and accelerometer 308 may be separate sensors or be combined with each other.

As shown in FIGS. 1A-C, the mounting bracket 202 may be rectangular and attached to the left 103c or right side 103b of the solar panels 102 such that the length of the mounting bracket 202 is parallel to the left 103c or right side 103b of the solar panels 102. By way of example and not limitation, the mounting bracket 202 may be on the bar frames 104 that are attached to the left 103c or right side 103b of the solar panels 102. The smartphone 200 may be inserted in the mounting bracket 202 such that the lower longitudinal side 205 of the smartphone 200 (see FIG. 2A) contacts the lower longitudinal side of the mounting bracket 202 such that the length of the smartphone is parallel to the left 103c or right side 103b of the solar panels 102. By way of example and not limitation, the screen of the smartphone 200 may be shown through an opening of the mounting bracket 202 while the rest of the components of the smartphone 200 are covered by the mounting bracket 202, as shown in FIGS. 2A-C. By way of example and not limitation, a tilting axis 105 (see FIG. 1B) may extend across the left 103c or right side 103b of the solar panels 102 and the panels may change angular orientation by inclining such tilting axis 105, which the tilting axis 105 may be parallel to the longitudinal sides 205 of the smartphone 200.

To determine the compass pointing direction of the solar panels 102, for example whether to point the solar panels 102 north, east, south, west, or somewhere in between, the magnetometer 304 (see FIG. 3) of the smartphone may be used. As shown in FIG. 2A, and by way of example and not limitation, the top portion 201a of the smartphone 200 having the cameras 212 and face sensors 214 may be the reference point for the magnetometer 304 to determine the direction the smartphone 200 is facing. Alternatively, the bottom portion 201b opposite to the top portion 201a, or one of the longitudinal sides 205, may be used to determine the direction the smartphone 200 and the solar panels 102 are facing. Although the magnetometer 304 is primarily referenced herein in determining the compass pointing direction, other sensors of the smartphone, such as the gyroscope 306 and accelerometer 308, may also be used to determine pointing direction. Referring back to FIGS. 2A and 1A, and by way of example and not limitation, the smartphone 200 may be placed in the mounting bracket 202 so that the top portion 201a of the smartphone 200 may point towards the front 103a of the solar panels 102 (see FIG. 1A), which may be opposite to lighting lamps 120 of the solar light tower 100 and the front side of the frame of the light tower having the hitch 110.

As shown in FIGS. 1A-B, and by way of example and not limitation, the light tower 100 having the solar panels 102 may change directional position and be pointed to the optimum compass direction (see FIG. 1B). Originally, as shown in FIG. 1A, the front 103a of the solar panels 102 may be pointing towards the north, for example. As shown on the compass meter 204 displayed on the smartphone 200 in FIG. 2A, the current compass direction 208a may read as facing the north, which corresponds to the pointing direction of the solar panels 102 in FIG. 1A. However, the optimum compass pointing direction 208b of the solar panels 102 that is shown on the display of smartphone 200 may be directed to approximately northwest, specifically 330 degrees clockwise from north. Consequently, the solar panels 102 and the light tower 100 may be pointed in such direction, as shown in FIG. 1B. When pointed in such direction, the current compass direction 208a may move towards the optimum compass direction 208b on the compass meter 204 displayed on the smartphone 200, as shown in FIG. 2B. As a result, the user may confirm that the solar panels 102 are pointed in the right direction using the software application displaying the compass meter 204 on the smartphone 200. By way of example and not limitation, the solar panels 102 and the solar light tower 100 may be turned towards the optimum pointing direction using the hitch pin 110 (See FIG. 1B). By way of example and not limitation, the solar light tower 100 may have a pointing mechanism that only changes the compass direction of the solar panels 102 rather than the whole solar light tower 100. When placed in the optimum pointing direction, and by way of example and not limitation, the portable solar light tower 100 and the solar panels 102 may be secured to the ground by deploying the stabilizers 116 (see FIG. 1C).

By way of example and not limitation, the compass meter 204 (see FIGS. 2A-C) may be displayed on the smartphone 200 in the form of a circular compass. The circular compass may have the north, east, south, and west labeled and have degree incrementations. By way of example and not limitation, the degree incrementations may start from the north being zero and increase clockwise, with east being 90-degrees, south being 180-degrees, west being 270-degrees, and north making up the full circle by being 360-degrees. Alternatively, the degree incrementations may increase counterclockwise. By way of example and not limitation, the degree incrementations may be outlined by 5-degree incrementations, with major compass directions that are multiples of 30-degrees labeled with the actual number quantity.

By way of example and not limitation, the compass meter 204 may have a current compass direction arrow 208a and an optimum compass direction arrow 208b. By way of example and not limitation, a shaded region 209 may exist between the current compass direction arrow 208a and the optimum compass direction arrow 208b, with the shaded region 209 decreasing as the current compass direction arrow 208a reaches the optimum compass direction arrow 208b. When the current compass direction arrow 208a reaches the optimum compass direction arrow 208b, the smartphone may emit a signal (e.g., sound or vibration) to let the user know that the optimum compass direction has been reached. The user can stop moving the light tower. In this manner, only one person is needed to set the point direction and panel tilt. The person making the adjustment need not visually inspect the screen of the smartphone. The shaded region 209 may provide an easy visibility differentiation between how for the current pointing direction of the solar panels 102 (see FIG. 1A) are from the optimum pointing direction (see FIG. 1B). By way of example and not limitation, the current compass direction 208a may correspond to the direction the top portion 201a (See FIGS. 2A-C) of the smartphone 200 points. The top portion 201a of the smartphone 200 may point in the same direction as the pointing direction of the solar panels 102 (see FIGS. 1A-C) so that when the front 103a of the solar panels are pointed at different compass directions, the compass meter 204 (see FIGS. 2A-C) measures the pointing direction of the solar panels 102. Alternatively, the bottom portion 201b opposite to the top portion 201a, or one of the longitudinal sides 205, may be used as the reference portion to determine the current compass direction 208a.

The optimum compass direction 208*b* may correspond to the compass direction at a certain duration of day of the year and/or location where the solar panels 102 (see FIG. 1B) should face to receive the maximum, or close to the maximum, of amount of solar energy from the sun. As shown in FIG. 4, and by way of example and not limitation, the software on the smartphone 200 may use the GPS location of the smartphone 200 and the date from the smartphone that corresponds to the location of the solar panels 102 and lighting tower 100 to retrieve from a database/server 404 the optimum compass direction for the solar panels 102. By way of example and not limitation, the smartphone 200 may send the GPS location to the database/server 404 to retrieve the optimum compass direction 208*b*. Based on the retrieved GPS location, optimum compass direction 208*b* may be displayed on the screen of the smartphone without user intervention. By way of example and not limitation, the software may also use the day of the year, such as the current week, month, or season in conjunction with or in the alternative, the GPS location to retrieve from the database 404 the optimum compass direction of the solar panels 102. By way of example and not limitation, the smartphone 200 may send the day of year to the database/server 404 to retrieve the optimum compass direction. The sending and receiving of information may be done through a network 402. By way of example and not limitation, the network 402 may include one, some, or all of cellular communications networks, data communications networks, and/or the Internet.

As shown in FIGS. 2A-C, and by way of example and not limitation, the software may display the GPS information 216 of the city, state, zip code, and country that the optimum compass direction arrow corresponds to. By way of example and not limitation, the optimum compass direction 208*b* (see FIGS. 2A-C) may change and be updated on the software when the GPS information 216 changes and as the day of the year changes. By way of example and not limitation, the optimum compass direction 208*b* may change and be updated on the software, and thus on the smartphone screen after the passing of a certain duration of time, the duration of time being 1 to 12 hours, 1-7 days, 1-4 weeks, or 1-12 months and as the light tower is being moved around. Using the optimum compass direction 208*b* allows the user to set up the solar panels 102 in the optimum orientation prior to sunrise or prior to when the sun is at the optimum solar position, which may be around one or two hours before and after noon time.

As shown in FIGS. 1B-C, the tilting mechanism 106 of the portable solar light tower 100 may tilt the solar panels 102 in a way that the left 103*c* and right 103*b* sides of the solar panel 102 are inclined at an angle. The smartphone 200 attached to the left 103*c* or right 103*b* sides of the solar panels 102 may detect such tilt. The gyroscope 306 (see FIG. 3) of the smartphone may detect the change in tilt since the smartphone 200 is attached to the left 103*c* or right 103*b* sides of the solar panels 102 (See FIGS. 1B-C) in the mounting bracket 202. Although the gyroscope 306 is primarily referenced herein with respect to measuring tilt, other sensors of the smartphone, such as the accelerometer 308 and the magnetometer 304, may also be used in conjunction to determine tilt direction. By way of example and not limitation, the longitudinal sides 205 (see FIG. 2A) of the smartphone 200 may be parallel to the tilting axis 105 (see FIGS. 1B-C) of the solar panels 102, the tilting axis 105 extending upwards and downwards of the left 103*c* and right 103*b* sides. As the tilting axis 105 changes angular position, the smartphone 200 may also have the same change in angular position along its longitudinal sides 205 (see FIGS. 2A-C). In other words, the smartphone 200 may have the same change in angular position along its pitch axis that rotates the two longitudinal sides 205 extending between the top and bottom portions 201*a-b* of the smartphone 200 upwards and downwards. The gyroscope 306 (see FIG. 3) may be able to measure such change in angular position along the tilting axis 105 and display the tilt angle 210*a* on the smartphone 200 (see FIGS. 2A-C) using the software. Alternatively, the lateral sides of the smartphone 200 may be placed parallel with the sides 103*b*, *c* of the solar panel 102, instead of the longitudinal side, and the gyroscope 306 may measure the change in the incline of the tilting axis 105 using the lateral sides. In other words, the smartphone 200 may measure the change in the incline of the tilting axis 105 using the roll axis of the smartphone 200.

As shown in FIG. 1B, and by way of example and not limitation, the solar panels 102 may be laid flat in a horizontal position where the left 103*c* and right 103*b* sides of the solar panels 102 are parallel to the ground. Consequently, the longitudinal sides 205 (see FIG. 2A) of the smartphone 200 may be horizontal and parallel to the ground because of how the smartphone is attached to the mounting bracket 202 and to the side of the solar panels 102. As shown in FIG. 2B that corresponds to the smartphone of FIG. 1B, the tilting meter 206 displayed by the software on the smartphone 200 may show the horizontal orientation of the smartphone 200 and the solar panels 102 with the current tilting direction arrow 210*a* pointing at zero degrees. The horizontal orientation of the solar panels 102 in FIG. 1B may not be the optimum tilting position, and instead the optimum tilting position may be, for example, 35 degrees upwards from the horizontal direction, as shown by the optimum tilting direction arrow 210*b*. As shown in FIG. 1C, and by way of example and not limitation, the tilting mechanism 106 may move the solar panels 102 to such optimum direction.

As the solar panels 102 tilt to the optimum angular direction, the current tilting direction arrow 210*a* (see FIGS. 2B-C) may move towards the optimum tilting direction arrow 210*b*. This is because the longitudinal sides 205 of the smartphone may be parallel to the tilting axis 105 (see FIGS. 1B-C) on the left 103*c* and right 103*b* sides of the solar panels 102, and the smartphone 200 may be equivalently tilted with the solar panels 102 about the pitch axis of the smartphone 200. By way of example and not limitation, the gyroscope 306 (see FIG. 3) of the smartphone 200 may measure such change in tilt angle and update the tilting meter 206 (see FIGS. 2A-C) accordingly.

By way of example and not limitation, and as shown in FIGS. 2A-C, the tilting meter 206 may be displayed on the smartphone 200 in the form of a semi-circle or, alternatively, a full-circle. By way of example and not limitation, the incrementation of the tilting measurement may be in degrees or radians. By way of example and not limitation, the midpoint of the arclength of the semi-circle may be labeled as zero-degrees, which the zero-degrees may correspond to when the tilting axis 105 (see FIG. 1B) and the longitudinal sides 205 of the smartphone 200 are horizontal. By way of example and not limitation, the endpoints of the semi-circle of the tilting meter 206 (see FIGS. 2A-C) may both be labeled as 90-degrees. Alternatively, one of the endpoints of the semi-circle of the tilting meter 206 may be labeled as 90-degrees and the other end as negative 90-degrees. By way of example and not limitation, the top half of the semi-circle of the tilting meter 206 may correspond to pivoting the tilting axis 105 (see FIG. 1C) of the solar panels 102 to be inclined such that the front 103a of the solar panels 102 is pointing downwards towards the ground. By way of example and not limitation, the bottom half of the semi-circle of the tilting meter 206 may correspond to pivoting the tilting axis 105 of the solar panels 102 to be inclined such that the front 103a of the solar panels is pointing upwards away from the ground. Alternatively, the aforementioned reading on the tilting meter 206 may be reversed. By way of example and not limitation, the degree incrementation on the tilting meter 206 may be outlined by 5-degree incrementations, with major tilting directions that are multiples of 30-degrees are labeled with the actual number quantity.

By way of example and not limitation, the tilting meter 206 may have a current tilting direction arrow 210a and an optimum tilting direction arrow 210b. By way of example and not limitation, a second shaded region 211 between the current tilting direction arrow 210a and the optimum tilting direction arrow 210b may exist to clearly show the difference between the current tilt and the optimum tilt of the solar panels. The second shaded region 211 may decrease as the current tilting direction arrow 210a reaches the optimum tilting direction arrow 210b. When the current tiling direction arrow 210a reaches the optimum tiling direction arrow 210b, the smartphone may emit an audible sound or vibrate (i.e., signal) to let the user know that the optimum tilt direction has been reached. The signal emitted by the smartphone may be different for optimum compass direction versus optimum tilt direction. The current tilting direction arrow 210a may correspond to the angular direction of the longitudinal sides 205 of the smartphone 200 relative to the ground when the smartphone is positioned within the mounting bracket 202 (see FIGS. 1B-C). The mounting bracket 202 may also have longitudinal sides parallel to the ground when the solar panels 102 are horizontal, as shown in FIG. 1B. As the solar panels 102 are tilted along the tilting axis 105, the longitudinal sides 205 of the smartphone 200 may also be tilted by the same amount as the tilting axis 105 about the pitch axis of the smartphone 200. The pitch axis may correspond to the upward and downward incline of the two longitudinal sides 205 along with the tilting axis 105, the two longitudinal sides 205 extending between the top and bottom portions 201a-b of the smartphone 200. Consequently, the current tilting direction arrow 210a (see FIG. 2C) may change on the tilting meter 206.

The optimum tilting direction 210b may correspond to the tilting direction at a certain day of the year and/or location where the solar panels 102 (see FIG. 1C) should be tilted to receive the maximum, or close to the maximum, of amount of solar energy from the sun. As shown in FIG. 4, and by way of example and not limitation, the software may use the GPS location of the smartphone 200 and the date from the smartphone that corresponds to the location of the solar panels 102 and lighting tower 100 to retrieve from a database 404 the optimum tilting direction for the solar panels. By way of example and not limitation, the smartphone 200 may send the GPS location to the database/server 404 to retrieve the optimum tilting direction 210b. Based on the retrieved GPS location, optimum tilting direction 210b may be displayed on the screen of the smartphone without user intervention. By way of example and not limitation, the software may also use the day of the year, such as the current day, week, month, or season in conjunction with or in the alternative, the GPS location to retrieve from the database 404 the optimum tilting direction of the solar panels 102. By way of example and not limitation, the smartphone 200 may send the day of year to the database/server 404 to retrieve the optimum tilting direction. The sending and receiving of information may be done through the network 402. By way of example and not limitation, the network 402 may include one, some, or all of cellular communications networks, data communications networks, and/or the Internet.

As shown in FIGS. 2A-C, and by way of example and not limitation, the software may display the GPS information 216 of the city, state, zip code, and country that the optimum tilting direction arrow 210b corresponds to. By way of example and not limitation, the optimum tilting direction 210b (see FIGS. 2A-C) may change and be updated on the software when the GPS information 216 changes and as the day of the year changes. By way of example and not limitation, the optimum tilting direction 210b may change and be updated on the software, and thus on the smartphone screen after the passing of a certain duration of time, the duration of time being 1 to 12 hours, 1-7 days, 1-4 weeks, or 1-12 months and as the light tower is being moved around. Using the optimum tilting direction 210b allows the user to set up the solar panels 102 (see FIG. 1C) in the optimum orientation prior to sunrise or prior to when the sun is at the optimum solar position, which may be around one or two hours before and after noon time.

The features of the software described herein allows for the setting up of multiple portable solar light towers 100 (see FIGS. 1A-C) at optimum orientations in different GPS locations prior to sunrise or prior to when the sun is at the optimum solar position, which may be around one or two hours before and after noon time. Consequently, one user may travel to different GPS locations, such as different zip codes and cities, and attach the same smartphone 200 to the different solar light towers 100 in different GPS locations to optimize the orientation of the solar panels 102. The user may conduct such tasks at a time different from when the sun would be at its optimum solar irradiation position at the GPS location, such as noon time. This allows for the solar panels 102 of the solar light tower 100 to harvest more solar energy and avoid guessing or changing the orientation of the solar panels during the optimum solar energy harvesting time.

Figure 5A:
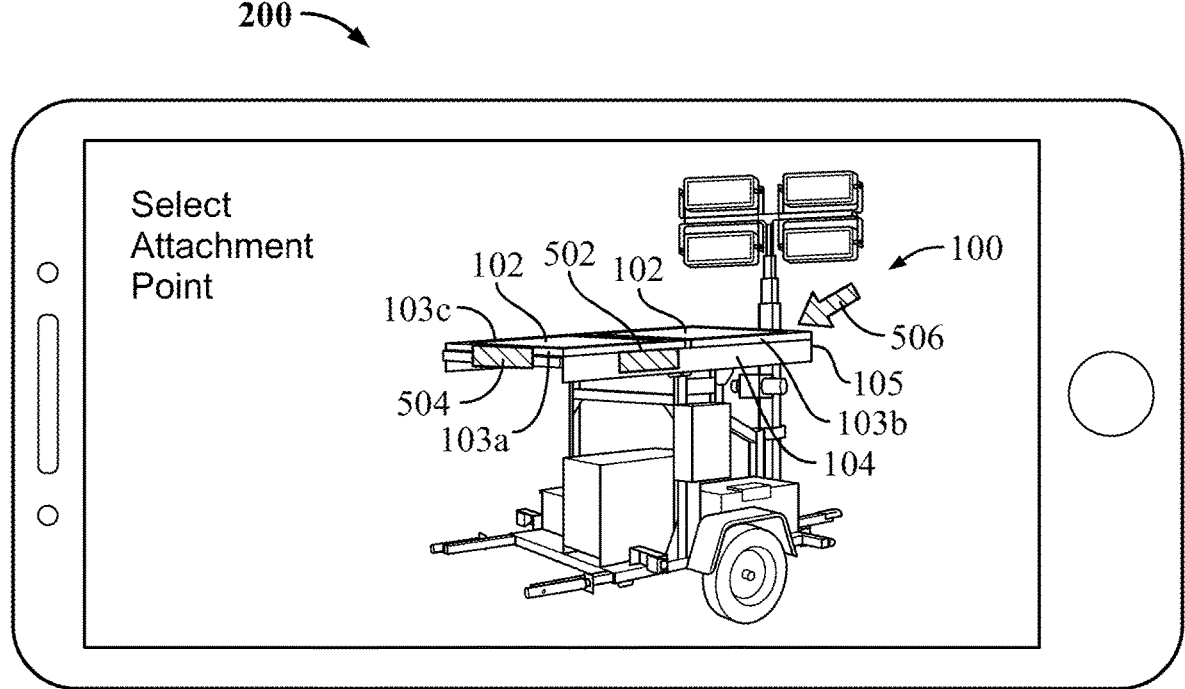
FIG. 5A shows the smartphone displaying a selection screen on where the smartphone may be mounted on the solar panel.

Referring now to FIG. 5A, optionally, the smartphone may be mounted to different areas on the solar panel or its frame. For example, the smartphone may be mounted to the side of the solar panel as shown by reference number 502 or the front of the solar panels as shown by reference number 504. Other locations are also contemplated such as location 506 (see FIG. 5A).

Figure 5B:
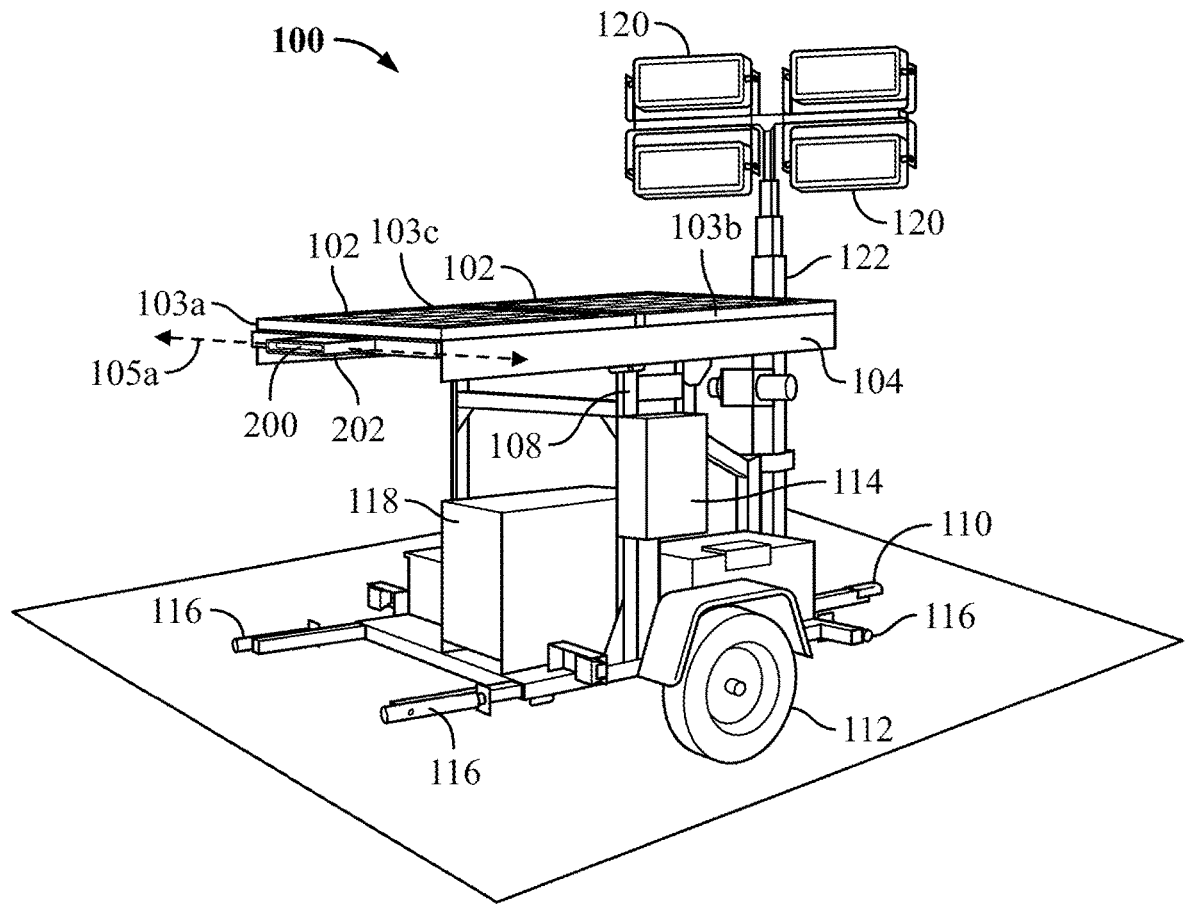
FIG. 5B shows the smartphone mounted on a different mounting position than FIGS. 1A-C, which may be selected on the selection screen in FIG. 5A.
Figure 6A:
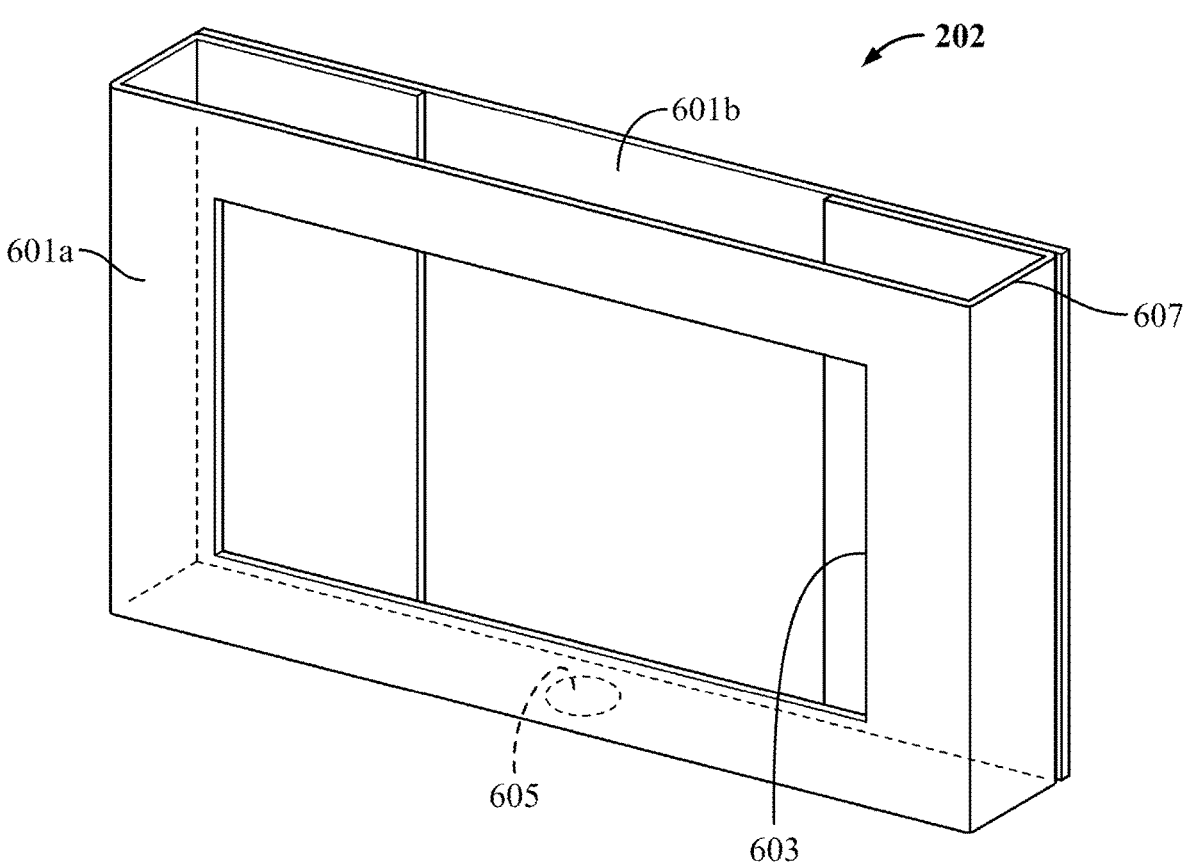
FIG. 6A shows a perspective view of one embodiment of the mounting bracket.
Figure 6B:
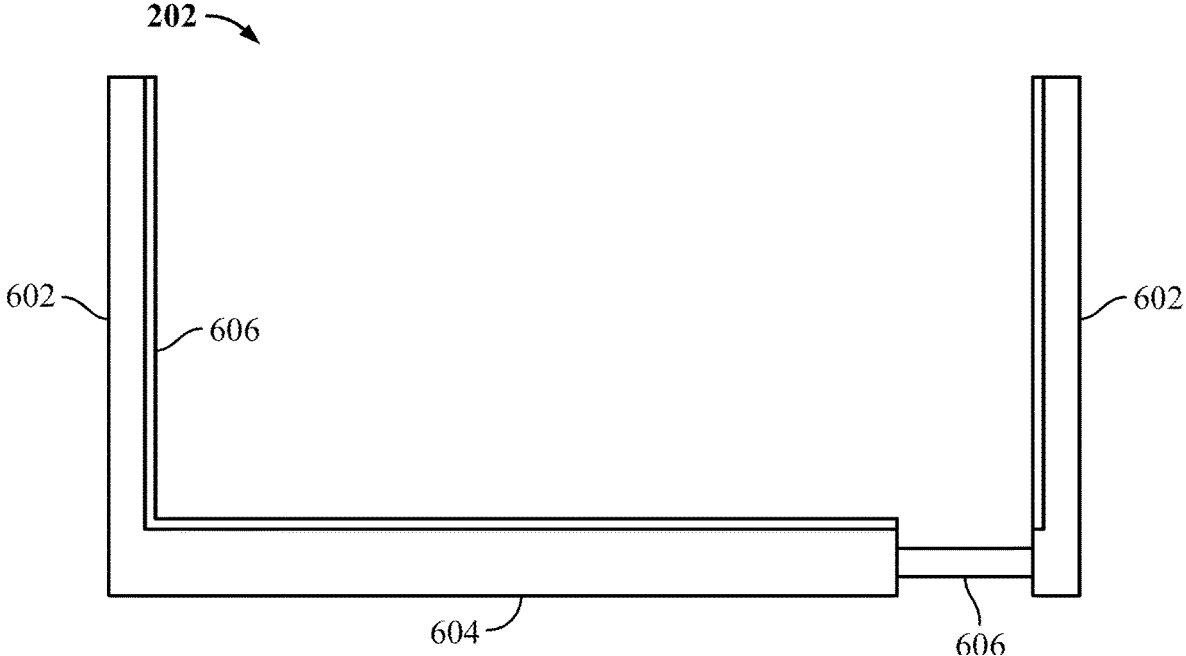
FIG. 6B shows a front view of another embodiment of the mounting bracket.
Figure 7:
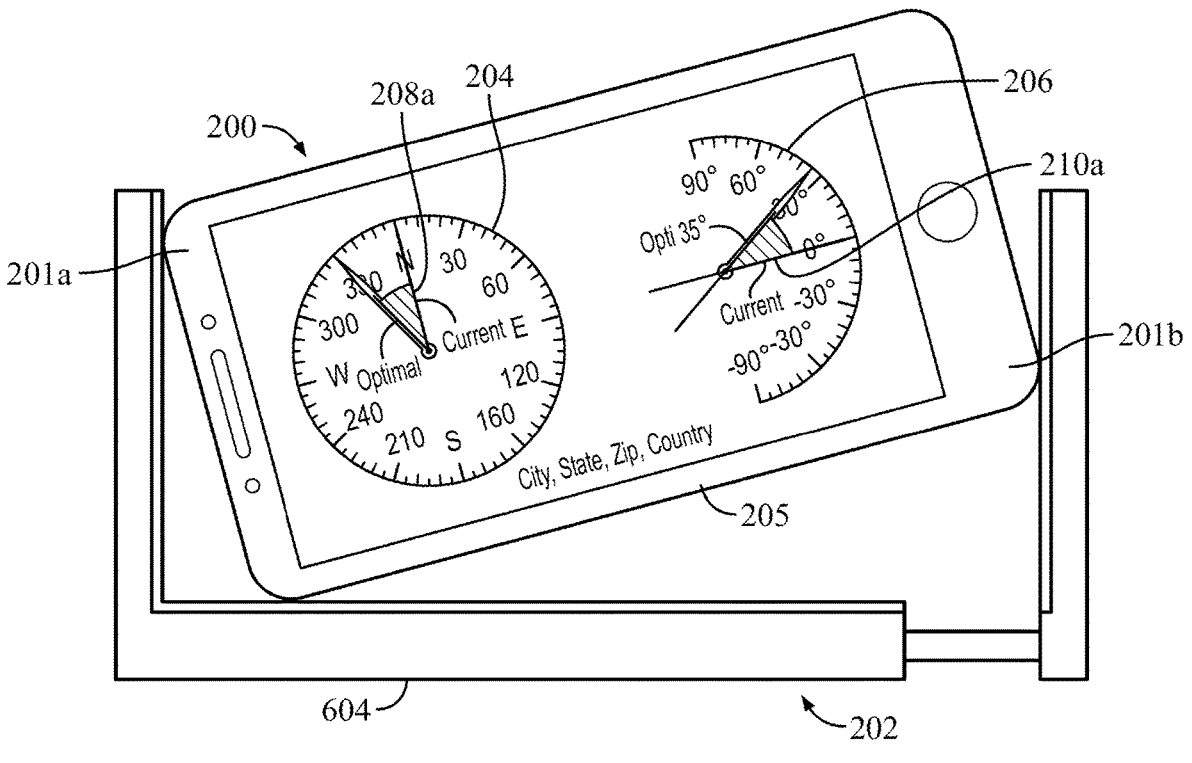
FIG. 7 shows the software on the smartphone calibrating the tilt direction to zero degrees.

Also, as shown in FIG. 5A, the software application may allow a user to select the attachment point of the smartphone 200 on the solar panels 102 and allow the smartphone to calibrate the measurement of the compass and tilt direction accordingly. As shown in FIG. 5B, the smartphone 200 may be attached at a different location on the solar panels, which may require the software to calibrate the measurement of the compass and tilt direction accordingly. As shown in FIGS. 6A-B, different embodiments of the mounting bracket 202 are shown. Moreover, as shown in FIG. 7, the smartphone might not be level to the mounting bracket, the software application may calibrate the tilt direction of the smartphone 200 to be horizontal.

Using the application software, a user may input or select the exact location of the attachment of the mobile device (e.g., smartphone 200) relative to the solar panels 102 to allow the software to calibrate the point and tilt measurements according to the attachment point. By way of example and not limitation, the software application may display on the smartphone 200 the light tower 100 with one or more attachment selection options 502, 504, and 506. By way of example and not limitation, the user may choose from the right 103*b*, front 103*a*, left 103*c*, and back side of the solar panels 102 to attach the smartphone thereto. The first attachment selection 502 may correspond to the right side 103*b* of the solar panels 102, the second attachment selection 504 may correspond to the front side 103*a* of the solar panels 102, the third attachment selection 506 may correspond to the back side of the solar panels 102, and there may exist a fourth attachment selection (not shown) corresponding to the left side 103*c* of the solar panels. By way of example and not limitation, if the user chooses the front or back side of the solar panels 102 as the attachment point, then the software application may be calibrated to use the lateral sides of the smartphone to measure tilt instead of the longitudinal sides and also calibrate the compass direction on the smartphone accordingly. By way of example and not limitation, the user may also input which way the top portion of the smartphone is pointing relative to the solar panel for the software to calibrate the compass pointing direction of the solar panels.

Referring now to FIG. 5B, the smartphone 200 is shown mounted to the front side 103*a* of the solar panels 102. Consequently, the software measuring the point and tilt of the solar panels 102 may recalibrate based on the new attachment location to correctly display the current point and tilt measurements 208*a* and 210*a*, respectively, (see FIGS. 2A-C) on the compass meter 204 and the tilting meter 206. The recalibration may also be done if the smartphone is attached elsewhere relative to the solar panels 102, as described elsewhere herein. By way of example and not limitation, if the smartphone 200 is placed in the mounting bracket 202 of the front side 103*a* of the solar panels 102 such that the front portion 201*a* (see FIGS. 2A-C) of the smartphone 200 is pointing towards the right side 103*b* or left side 103*c* of the solar panels 102, the software may recalibrate to make the current point direction 208*a* of the compass meter 204 to read as if the front portion 201*a* of the smartphone 200 is facing the front side 103*a*. The front portion 201*a* of the smartphone 200 may be the reference portion for the magnetometer of the smartphone to determine which way the smartphone is pointing. The user may input in the software the location of smartphone attachment relative to the solar panels 102 (e.g., front side 103*a* of the solar panels 102) and the orientation of the smartphone 200 in the mounting bracket 202 (e.g., which way the front portion 201*a* of the smartphone 200 is facing). The software may then receive inputs of the actual compass direction that the smartphone 200 is facing and output the necessary compass direction of the smartphone 200 relative to the solar panels 102, which the output may need to point to the front side 103*a*. Alternatively, the software may recalibrate to use one of the longitudinal sides 205 of the smartphone 200, or the rear portion 201*b*, as the reference portion for determining current point direction 208*a* on the compass meter 204.

By way of example and not limitation, if the smartphone 200 is placed in the mounting bracket 202 of the front side 103*a* of the solar panels 102 with the longitudinal sides of the smartphone 200 being perpendicular to the right and left sides 103*b-c* of the solar panels 102, the software may recalibrate to use the lateral sides and the roll axis of the smartphone 200 in calculating current tilt direction 210*a* (see FIGS. 2A-C). The roll axis may be the axis that pivots the smartphone 200 about its lateral sides. When the user inputs in the software the location of smartphone attachment relative to the solar panels 102 (e.g., front side 103*a* or right side 103*b* of the solar panels 102 shown in FIG. 5A), the software may then calibrate whether to use the longitudinal sides of the smartphone and the pitch axis or the lateral sides of the smartphone and the roll axis in calculating current tilt direction 210*a*. Such calibration may be needed since different gyroscope axis of the smartphone need to be used depending on how the smartphone 200 is being tilted with the solar panels 102. For example, using the longitudinal sides and pitch axis of the smartphone 200 in measuring tilt direction may not work when the smartphone 200 is attached to the front side 103*a* of the solar panels and having its longitudinal sides perpendicular to right and left sides 103*b-c* of the solar panels 102.

Referring now to FIG. 6A, one embodiment of the mounting bracket 202 is shown. By way of example and not limitation, the mounting bracket 202 may be rectangular and be made from a plurality of sheet metal 601*a-b*. By way of example and not limitation, the sheet metal may be made from a steel, aluminum, or titanium alloy. By way of example and not limitation, the first sheet metal 601*a* may be a C-channel/U-channel sheet metal with bent side edges and also a bent bottom surface. A second sheet metal 601*b* that is flat may be incorporated with the mounting bracket 202 to create an enclosure for the smartphone and act as the rear wall of the bracket. The smartphone may be inserted inside the mounting bracket 202 through an upper insert opening 607 and be rested upon the bottom surface of the mounting bracket 202. By way of example and not limitation, the bottom surface may have a drain hole 605 to withdraw rainwater from the interior of the mounting bracket. There may exist a rectangular opening 603 on the base of the first sheet metal 601*a* that has the largest surface area. The rectangular opening 603 may be big enough for the screen of the smartphone to be visible through the opening 603. By way of example and not limitation, the rectangular opening 603 may have a transparent layer such as a glass or plastic layer. The mounting bracket 202 may be attached to different areas of the solar panels or its frame, as described elsewhere herein (see FIG. 5A), so that the smartphone having the software may measure the point and tilt of the solar panels in various locations of the solar panels. By way of example and not limitation, the mounting bracket may be attached to the right 103*b*, front 103*a*, left 103*c*, and back side of the solar panels 102 (see FIG. 5A).

Referring now to FIG. 6B, another embodiment of the mounting bracket 202 is shown. By way of example and not limitation, the mounting bracket 202 may be rectangular with at least one longitudinal side 604 and two lateral sides 602. By way of example and not limitation, the inner portions 606 of the sides of the mounting bracket 202 may have slots to receive the smartphone. Alternatively, the inner portions 606 of the mounting bracket 202 may be made from a flexible material that deforms when the smartphone is placed inside the mounting bracket 202 to form around the contours of the smartphone. By way of example and not limitation, the longitudinal side 604 of the mounting bracket 202 may have a telescoping mechanism 606 to shorten and lengthen the length of the mounting bracket 202 to accommodate smartphones with different lengths. By way of example and not limitation, the lateral sides 602 of the mounting bracket 202 may be long enough to enclose any width of a conventional sized smartphone that may be regular or large sized. The mounting bracket 202 may be attached to different areas of the solar panels or its frame, as described elsewhere herein (see FIG. 5A), so that the smartphone having the software may measure the point and tilt of the solar panels in various locations of the solar panels.

Referring now to FIG. 7, the software on the smartphone 200 calibrating the tilt direction to zero degrees is shown. If the longitudinal side of the smartphone 200 does not align with the longitudinal side of the mounting bracket 202, such that the smartphone 200 is orientated at an angle relative to the mounting bracket 202 (i.e., the smartphone was improperly placed in the mounting bracket, the software application may calibrate the current tilt arrow 210*a* to read as zero degrees as if the smartphone 200 is horizontal relative to the ground. To ensure accuracy of current tilt direction 210*a*, such calibration may be done when the solar panels having the mounting bracket 202 attached thereto are laid flat and have a zero-tilt angle relative to the ground, as seen in FIGS. 1A-B.

Figure 8:
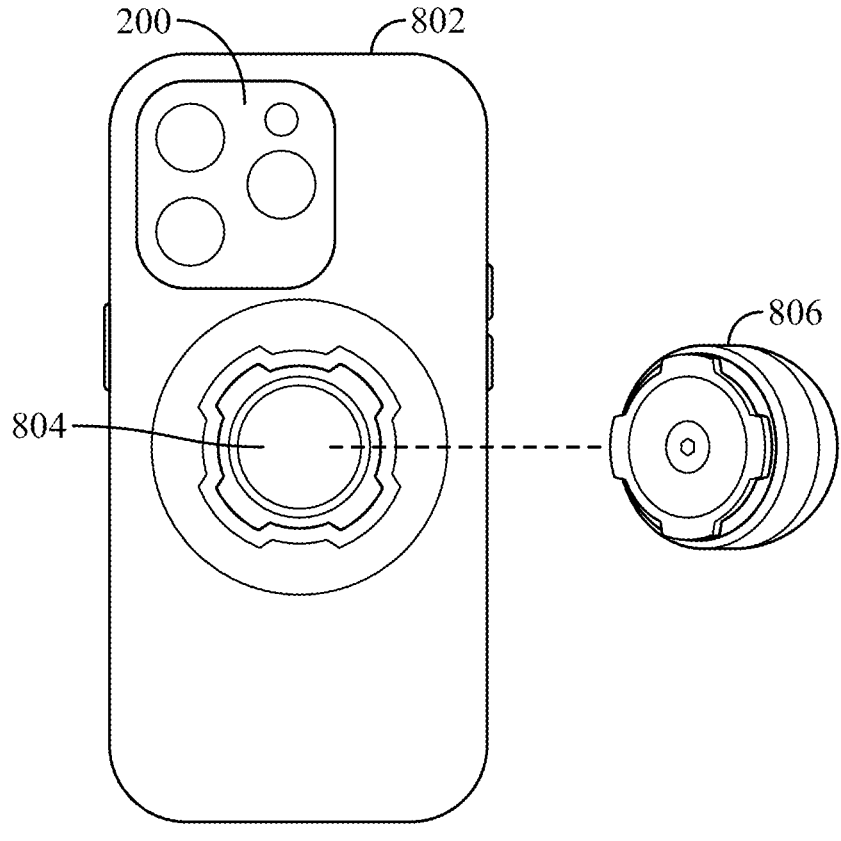
FIG. 8 shows a casing that may be used to mount the smartphone to the solar panels of the solar light tower.

Referring now to FIG. 8, a casing 802 that may be used to mount the smartphone to the solar panels of the solar light tower is shown. Instead of using a mounting bracket, the smartphone may be attached to the solar panels, or bar frame, using a smartphone casing 802. The smartphone casing 802 may have a locking mechanism 804 on its outer surface that interlocks with a mount 806 attached to the solar panels, the mount 806 having a corresponding locking mechanism. By way of example and not limitation, the locking mechanism may be centered on the smartphone casing 802. By way of example and not limitation, the smartphone casing and the mount may be an altered form of a QUAD LOCK casing designed for attachment to a solar light tower 100, specifically the solar panels.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of pointing and tilting a solar panel at an optimum orientation using a smartphone, comprising:
   attaching the smartphone to a side of the solar panel with longitudinal sides of the smartphone being parallel to a tilting axis extending across the side of the solar panel, and a top portion of the smartphone having a camera facing towards a front of the solar panel for aligning an orientation of the smartphone to an orientation of the solar panel;
   displaying on the smartphone a compass meter and a tilt meter;
   the compass meter showing a current compass direction of the front of the solar panel and an optimum compass direction of the front of the solar panel;
   the tilt meter showing a current tilt direction of the tilting axis of the solar panel and an optimum tilting direction of the tilting axis of the solar panel;
   manually pointing the front of the solar panel in the optimum compass direction; and
   manually tilting the solar panel by changing an incline direction of the tilting axis to match the optimum tilting direction.

2. The method of claim 1, wherein the current compass direction is displayed as a first arrow and the optimum compass direction is displayed as a second arrow on the compass meter, the first arrow coinciding with the second arrow when the front of the solar panel is pointed to the optimum compass direction.

3. The method of claim 2, wherein the current tilt direction is displayed as a third arrow and the optimum tilting direction is displayed as a fourth arrow on the tilt meter, the third arrow coinciding with the fourth arrow when the solar panel is tilted to the optimum tilting direction.

4. The method of claim 1, wherein the optimum compass direction and the optimum tilt direction are determined using a GPS location of the solar panel.

5. The method of claim 4, wherein the optimum compass direction and the optimum tilt direction are further determined using a time of year.

6. The method of claim 1, wherein the smartphone is attached to the solar panel using a mounting bracket.

7. The method of claim 6, wherein a length of the mounting bracket is adjustable to accommodate a size of the smartphone.

8. The method of claim 1, wherein the smartphone is attached to the solar panel using a phone casing.

9. The method of claim 1, further comprising inputting into the smartphone an attachment location of the smartphone on the solar panel.

10. The method of claim 1, wherein the solar panel is attached to a portable solar light tower.

11. The method of claim 1, further comprising deploying a stabilizer of the portable solar light tower after the pointing and tilting of the solar panel.

12. The method of claim 10, wherein the portable solar light tower is also pointed in the optimum compass direction.

13. A method for orientating solar panels of portable solar light towers in optimum solar positions in at least two different GPS locations, comprising:
   orientating a first solar panel of a first portable solar light tower in a first optimum orientation at a first GPS location by:
      attaching a smartphone to a side of the first solar panel of the first portable solar light tower to align an orientation of the smartphone to an orientation of the solar panel;
      displaying on the smartphone a first optimum compass direction and a first optimum tilt direction based on data pertaining to the first GPS location retrieved from a database;
      pointing the first solar panel to the first optimum compass direction and verifying the pointing of the first solar panel using the smartphone;
      tilting the first solar panel to the second optimum tilt direction and verifying the tilting of the first solar panel using the smartphone;
   orientating a second solar panel of a second portable solar light tower in a second optimum orientation at a second GPS location by:
      attaching the smartphone to a side of the second solar panel of the second portable solar light tower;
      displaying on the smartphone a second optimum compass direction and a second optimum tilt direction based on data pertaining to the second GPS location retrieved from the database;
      pointing the second solar panel to the second optimum compass direction and verifying the pointing of the second solar panel using the smartphone; and
      tilting the second solar panel to the second optimum tilt direction and verifying the tilting of the second solar panel using the smartphone.

14. The method of claim 13, wherein the orientating of the first and second solar panels are done at a time different than an optimum solar irradiation time.

15. The method of claim 14, wherein the optimum solar irradiation time is during noon.

16. The method of claim 13, wherein displaying on the smartphone the first and second optimum compass directions and the first and second optimum tilt directions is also based on data pertaining to a current time of year.

17. The method of claim 16, wherein the current time of year is categorized based on months of year.

18. The method of claim 16, wherein the current time of year is categorized based on weeks of year.

19. The method of claim 13, wherein the smartphone displays a first current compass direction and a first current tilt direction of the first solar panel when the smartphone is located at the first GPS location, and the smartphone displays a second current compass direction and a second current tilt direction of the second solar panel when the smartphone is located at the second GPS location.

20. The method of claim 13, wherein the smartphone measures the first and second current tilt direction using angular orientations of a longitudinal axis extending across a length of the smartphone.

* * * * *